United States Patent [19]

Collucci

[11] Patent Number: 4,917,653
[45] Date of Patent: Apr. 17, 1990

[54] ELASTOMERIC COUPLING

[76] Inventor: Charles N. Collucci, 83 Spruce St., Bloomfield, N.J. 07003

[21] Appl. No.: 225,251

[22] Filed: Jul. 28, 1988

[51] Int. Cl.[4] .............................................. F16D 3/58
[52] U.S. Cl. ........................................ 464/85; 464/87
[58] Field of Search ...................... 464/51, 81, 85, 86, 464/87, 106

[56] References Cited

U.S. PATENT DOCUMENTS

| | | | |
|---|---|---|---|
| 1,194,662 | 8/1916 | Rathbun | 464/81 |
| 1,834,521 | 12/1931 | Froussard | 464/85 |
| 2,479,278 | 8/1949 | Tessendorf et al. | 464/85 |
| 2,696,719 | 12/1954 | Sklar | 464/85 |
| 3,038,323 | 6/1962 | Wallman | 464/85 |
| 3,469,417 | 9/1969 | Wakelin | 464/85 X |
| 3,525,238 | 8/1970 | Cruz | 464/85 |
| 4,214,458 | 7/1980 | Philleo | 464/85 |
| 4,487,591 | 12/1984 | Berg | 464/85 |

FOREIGN PATENT DOCUMENTS

| | | | |
|---|---|---|---|
| 489885 | 10/1975 | U.S.S.R. | 464/85 |
| 669115 | 6/1979 | U.S.S.R. | 464/85 |

OTHER PUBLICATIONS

Maurey Manufacturing Corp., Maurey Standard Products, Catalog SPC 88, p. 83, 1987.
Browning Manufacturing Division of Emerson Electric Co., Catalog No. 100, 1986, p. 1-24, 12/1986.
The Falk Corporation, Standard Product Catalog SPC 82, pp. 483-484, 8/1980.

*Primary Examiner*—Daniel P. Stodola
*Attorney, Agent, or Firm*—McAulay Fisher Nissen & Goldberg

[57] ABSTRACT

An elastomeric coupling is disclosed for rotatably connecting the ends of a pair of substantially inline rotatable shafts. The coupling includes a pair of hubs connected to the ends of the associated shafts for rotation therewith. The hubs are formed having a plurality of radially oriented and longitudinally extending passageways. The hubs are located in tandem with the passageways of one hub substantially aligned with the passageways in the other hub to form a plurality of pairs of substantially aligned passageways in the adjacently located hubs. A plurality of elongated, flexible elastomeric members are fitted within the pairs of adjacently aligned hub passageways to operatively and drivingly connect the hubs to one another. The arrangement is such that the elastomeric members transmit the rotation of one of the hubs, imparted by the rotation of its associated shaft, to the other hub and, thereby, to the other shaft associated with the other hub.

23 Claims, 3 Drawing Sheets

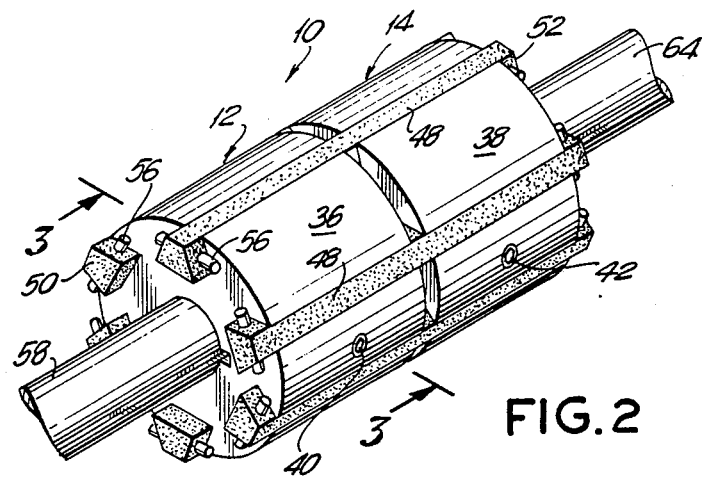
FIG. 2
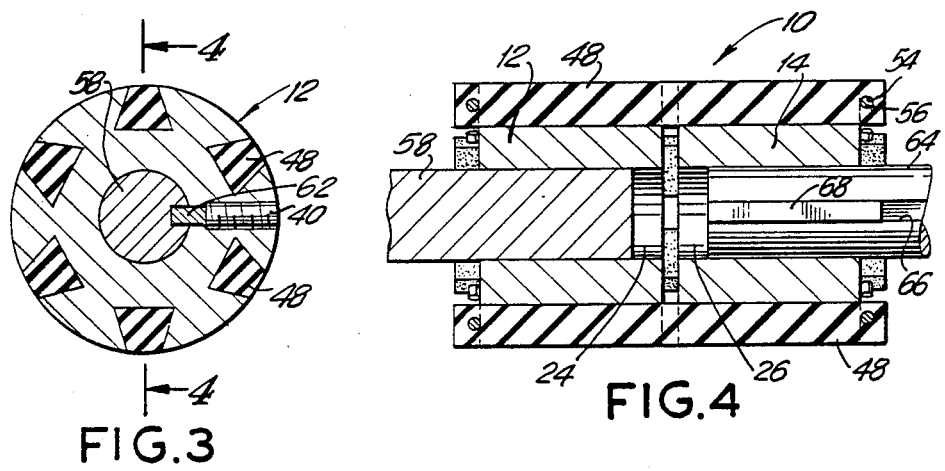
FIG. 3
FIG. 4
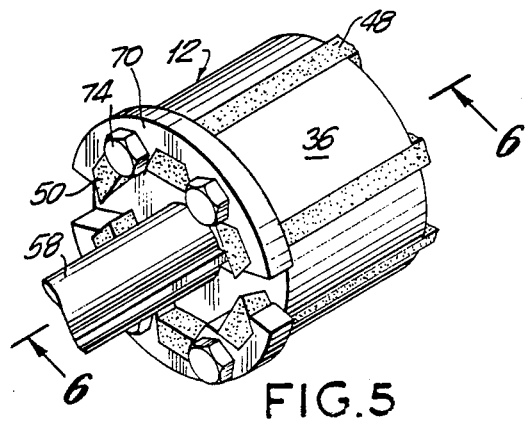
FIG. 5
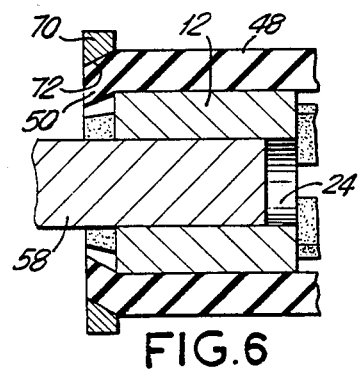
FIG. 6

ELASTOMERIC COUPLING

BACKGROUND OF THE INVENTION

1. Field of the Invention

This invention relates generally to an elastomeric coupling and, more specifically, to an elastomeric coupling for rotatably connecting a pair of hubs to the ends of a pair of substantially inline rotatable shafts.

2. Description of the Prior Art

It is known to couple the ends of a pair of substantially inline rotatable shafts so that one shaft, driven by a motor, drives the other shaft by means of interengaging hubs connected to the ends of the respective shafts. One of such couplings available from Maurey Manufacturing Corp., Chicago, IL, includes a pair of hubs each having a central bore at one end for receiving therein the end of one of the respective shafts. The hubs are secured to the respective shafts for rotation therewith.

The other ends of the hubs are each formed with finger-like projections which are disposed to interfit to drivingly connect the hubs to one another. Since the hubs typically are made of steel or cast iron, a rubber spider member having a plurality of radially disposed and outwardly projecting fingers is disposed between the facing ends of the hubs, with the fingers of said spider sandwiched between the adjacently interfitting projections of the respective hubs. The spider serves as a cushioning compression member or spacer to reduce wear on the interfitting projections. The spider serves no function in mechanically coupling the hubs to one another. The arrangement is such that rotation of one of the hubs, imparted by rotation of the associated driven shaft, drives the other hub by means of the interfitting projections, thereby rotating the other shaft that is connected to the other hub. The spider also serves to cushion the shock of the interfitting projections during rotation of the hubs.

Although the spider affords some degree of flexibility in connecting the hubs to the ends of shafts that are not in perfect alignment, the ability to use the Maurey coupling in applications where the ends of the shafts are signifiantly misaligned is severely hampered. Also, since the spider is sandwiched between the hubs, it is not easy to detect when the spider becomes worn, otherwise ruptures, and is in need of replacement. The failure to timely replace a worn-out spider, that is, one that has lost a large measure of its cushioning function, can cause significant damage to the interfitting projections thereby requiring replacement of the hubs. Replacement of the spider also requires that at least one of the hubs be removed from the associated shaft to gain access to the worn spider, thereby increasing the down-time of the machines connected to said shafts during servicing of the hubs.

Another known coupling is that available from the Browning Manufacturing Division of Emerson Electric Co., Maysville, KY, and The Falk Corporation, Milwaukee, WI, in which the two hubs are mechanically coupled together by a continuous flexible grid. Specifically, each of the hubs has a plurality of grooves or passageways disposed radially around the perimeter of the hub, and extending longitudinally parallel to the axis of rotation. The grooves in one of the hubs are aligned with the corresponding grooves in the other hub, whereupon a ring-like flexible grid made of spring steel is positioned within the rows of aligned grooves. A grease lubricant is packed over the grid, and a cover is fitted around and secured to the coupled hubs. Prior to joining the two hubs together, the opposite ends of the hubs were first joined to the ends of the respective shafts in conventional manner.

The respective grids in the Browning and Falk couplings do, indeed, serve to couple the two hubs to one another, and also provide some degree of flexibility in connecting the ends of misaligned shafts. However, assembly of these types of couplings requires a fair amount of skill. Also, it is necessary to first disassemble the cover from the coupling and remove the grease lubricant in order to inspect the grid for possible wear. This, again, results in unwarranted down-time in the machines connected to the shafts.

The present invention provides an improved coupling arrangement, as compared to known couplings, which affords increased flexibility to accommodate parallel or angular misalignment of the shafts, and which is easily assembled and serviced as the need arises.

SUMMARY OF THE INVENTION

The elastomeric coupling of the present invention includes a pair of hubs, each having a bore at one end for receiving the end of one of the respective shafts. The hubs are keyed to the shafts for rotation therewith.

Each of the hubs has a plurality of radially oriented passageways extending longitudinally the full length of the hub, wherein selected passageways in one of the hubs are substantially aligned with corresponding passageways in the other one of said hubs to form a plurality of pairs of substantially aligned passageways in the adjacently located hubs.

The hubs are coupled together by a plurality of elongated, flexible elastomeric members. Specifically, separate ones of said elastomeric members are configured to be received within pairs of adjacently aligned hub passageways in a close fitting relationship to operatively and drivingly connect the hubs to one another. The plurality of passageways in each of the hubs are disposed in parallel relation to one another so that the elastomeric members are essentially subjected to shear stresses during rotation of the hubs.

The passageways are configured to prevent radially outward displacement of the elastomeric members from the passageways during rotation of the hubs. This eliminates the need for any cover for the hubs to keep the elastomeric member in place. Also, the coupling includes components for limiting axial displacement of the elastomeric members within the aligned passageways during rotation of the hubs.

In operation, the elastomeric members transmit the rotation of one of the hubs, imparted by the rotation of its associated driven shaft, to the other one of said hubs and, thereby, to the other shaft associated with the other hub.

Additional features and advantages of the present invention will become more apparent from a consideration of the following detailed description when taken in conjunction with the accompanying drawings.

BRIEF DESCRIPTION OF THE DRAWINGS

FIG. 2 is a perspective view of the assembled elastomeric coupling shown in FIG. 1;

FIG. 3 is a sectional view taken along line 3—3 of FIG. 2;

FIG. 4 is a sectional view taken along line 4—4 of FIG. 3;

FIG. 5 is a partial perspective view of the elastomeric coupling of the present invention showing an alternate embodiment, in the form of an end plate, for limiting axial movement of the elastomeric members within the associated passageways of the hub;

FIG. 6 is a sectional view taken along line 6—6 of FIG. 5;

DESCRIPTION OF THE PREFERRED EMBODIMENT

Figure 1:
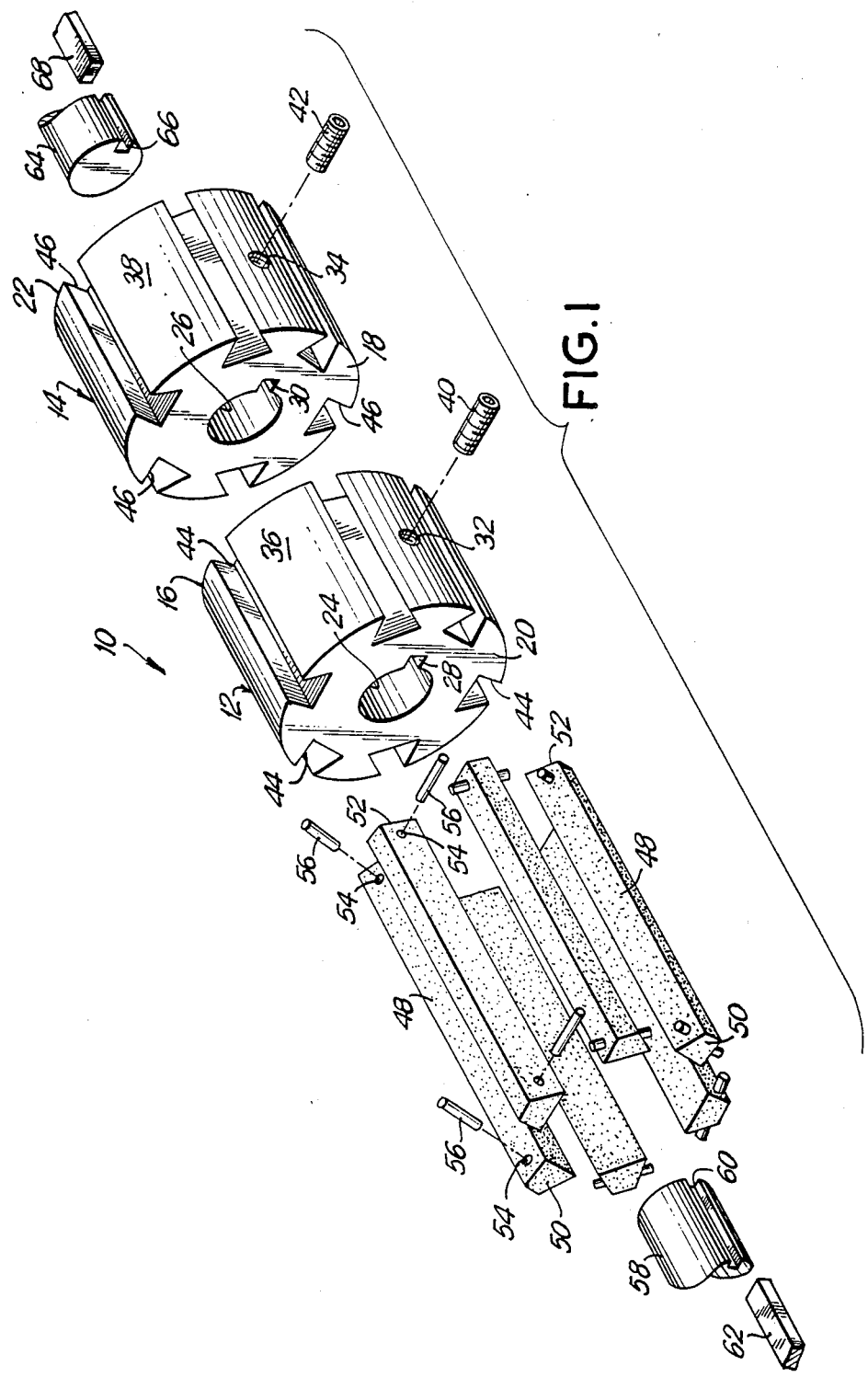
FIG. 1 is an exploded, perspective view of the elastomeric coupling constructed in accordance with the present invention.

Referring to the drawings, and in particular to FIGS. 1-4, numeral 10 represents an elastomeric coupling for rotatably connecting the ends of a pair of substantially inline shafts to one another. Coupling 10 includes a pair of hubs 12 and 14 spaced apart from one another and positioned in tandem with the respective ends 16 and 18 facing each other. The opposite ends of the respective hubs are identified by numerals 20 and 22.

Each hub 12 and 14 is formed having a bore represented by numerals 24 and 26, respectively, which preferably extends longitudinally the full length of the hub along its axis of rotation. Each of the bores 24 and 26 is formed having a keyway slot represented by numerals 28 and 30, respectively, which also extends the full length of the bore. Keyway slots 28 and 30 enable the respective hubs 24 and 26 to connect with associated shafts in the manner hereinafter described.

Each hub 12 and 14 also has a threaded opening represented by numerals 32 and 34, respectively, communicating between the respective keyway slots 28 and 30 and the outer surfaces 36 and 38 of the respective hubs. Keyway slots 28 and 30 each are adapted to receive a threaded fastener represented by numerals 40 and 42, respectively, such as set screws. As will be apparent in describing the assembly of the coupling, the fasteners 40 and 42 assist in fastening the hubs 12 and 14 to the respective shafts.

Each hub 12 and 14 also is formed having a plurality of radially oriented passageways represented by numerals 44 and 46, respectively, extending longitudinally the full length of the hub. In the preferred construction, the passageways 44 and 46 are formed in the outer surfaces 36 and 38 of the respective hubs to permit visual inspection of the members adapted to be received therein. However, if desired, the passageways 44 and 46 may be formed directly in the walls of the respective hubs so that only the ends of the passageways are visible in the ends 16, 18, 20 and 22 of the hubs.

The passageways 44 and 46 each are formed having a truncated wedge-like transverse cross-section with the narrow portion of the cross-section located at the outer surfaces 36 and 38 of the respective hubs. The passageways formed in each of the hubs are parallel to one another for reasons hereinafter described.

As is now apparent, the hubs 12 and 14 are virtually identical to one another in construction. The hubs may be made of metal or plastic, each having a length of approximately 1.50 inches (3.81 cm) and a diameter of approximately 2.125 inches (5.40 cm). The diameter of the bore will vary depending on the diameter of the shafts to be coupled. The number of passageways formed in each hub may vary, but preferably is 6 in number spaced equally around the perimeter of the hub to locate the centers at 60 degree intervals. The configuration of each passageway is such to accommodate a V-belt as hereinafter described, with the width dimensions of the passageway typically being 0.50 inches (1.27 cm) at its base and 0.25 inches (0.635) at its open end. The height or depth of the passageway is 0.344 inches (0.874 cm), and the angle substended between the base wall and a side wall is approximately 70 degrees. It will be appreciated that these dimensions are illustrative and may be varied, as desired or required, for a particular application.

In accordance with the teachings of the invention, there is provided a plurality of elongated, flexible elastomeric members 48, each having a configuration to be received within the passageways 44 and 46 of the respective hubs in close fitting relation. The elastomeric members 48 may be formed of rubber, having cotton or steel cords, as would be encountered in standard V-belt constructions. The length of each member 48 is greater than the combined length of the adjacently positioned hubs 12 and 14 such that in the assembled condition of the coupling, the ends 50 and 52 of each member 48 project beyond the ends 20 and 22 of the respective hubs. A hole 54 is formed in each of the projecting ends 50 and 52 for receiving a pin 56 to limit axial movement of the members 48 within passageways 44 and 46, in the assembled state of the coupling, as hereinafter described.

In assembly, hub 12 is mounted to its associated shaft 58 by fitting the end of the shaft within bore 24. For purpose of assembly, we may assume that shaft 58 is rotatably driven by a motor (not shown). Shaft 58 typically is formed having a keyway slot 60. In assembly, hub 12 will be selected from a grouping having a bore that is sized to receive the end of shaft 58 in close fitting relation, with the respective keyway slots 28 and 60 essentially corresponding in shape to one another. The keyways 28 and 60 are aligned to receive a key 62 which serves to connect hub 12 to shaft 58 for rotation therewith. With the parts thus assembled, the set screw 40 is threaded downwardly within opening 32 to abut against key 62 to securely hold the key in place.

Hub 14 is mounted to its associated shaft 64 in a similar fashion. That is, the end of shaft 64 is fitted within bore 26. Shaft 64 also has a keyway slot 66 which is aligned with keyway slot 30 of hub 14 for receiving a key 68. Set screw 42 is then threaded within opening 34 to securely hold key 68 in place. For purpose of discussion, shaft 64 is the shaft to be rotatably coupled to the driven shaft 58 for rotation therewith.

The hubs 12 and 14, with their associated shafts 58 and 64 respectively connected thereto, are now positioned with the passageways 44 of hub 12 aligned with the passageways 46 in hub 14 to form a plurality of pairs of substantially aligned passageways in the adjacently located hubs. The elastomeric members 48 are now inserted, endwise, within the aligned passageways in close fitting relation to operatively and drivingly connect the hubs to one another. The parallel relation of the passageways in each hub is such that the elastomeric members 48 are essentially subjected to shear stresses during rotation of the hubs.

As will be appreciated, the configuration of the aligned passageways 44 and 46 is such to prevent radially outward displacement of the elastomeric members 48 from said passageways during rotation of the hubs. Also, with the coupling thus assembled, the pins 56 are frictionally inserted within the holes 54 in the projecting ends 50 and 52, respectively, of the elastomeric members to limit axial displacement of said members within the aligned passageways during rotation of the hubs.

Specifically, the inserted pins 56 have end portions which project beyond the edges of their associated elastomeric members 48 to overlie an edge of the associated passageways 44 and 46. The arrangement is such that the projecting end portions of the pins 56 abut against the respective end surfaces 20 and 22 of hubs 12 and 14 to limit axial movement of said members within the aligned passageways. Pins 56 may preferably be of the kind known as cotter pins having ends adapted to be flared or spread apart after insertion through holes 54.

With the coupling 10 thus assembled, the elastomeric members 48 transmit the rotation of hub 12, imparted by rotation of driven shaft 58, to hub 14 and, thereby, to shaft 64. The members require no lubrication, and 48 may be easily inspected for wear and quickly replaced, as required, without having to disassemble the hubs from their associated shafts. Also, the flexibility and resilient compressibility of the elastomeric members accommodates shock loads due to torsional deflection, as well as angular and parallel misalignment of the shafts. The spacing between the hubs preferably should be between 0.125 inch (0.3175 cm) and 1.0 inch (2.54 cm), but this may vary depending upon the diameters of the shafts, and the size of the couplings.

FIGS. 5-8 show alternate embodiments of the invention; notably, the configuration of the passageways in the respective hubs, the shape of the associated elastomeric members, the manner in which axial movement of the elastomeric members in the associated passageways is limited, and the manner of keying the hubs to the associated shafts. In other aspects, the structure and function of the couplings are substantially the same as previously described so that similar numbers are used to designate those components common to the embodiment of FIGS. 1-4.

In FIGS. 5 and 6, the pins 56 are replaced with end plates 70 having a tapered or inclined surface 72. A plurality of holes are provided in plates 70 for receiving a bolt 74. Complementary threaded holes are provided in the ends of the hubs. As such, when the plates are mounted to the ends of the hubs by means of bolts 74, the inclined surfaces 72 bend the ends 50 and 52 of elastomeric members 48 downwardly, as shown in FIG. 6, beyond the end edges of the associated passageways, to prevent axial movement of the elastomeric members 48 in the respective aligned passageways of the hubs.

Figure 7:
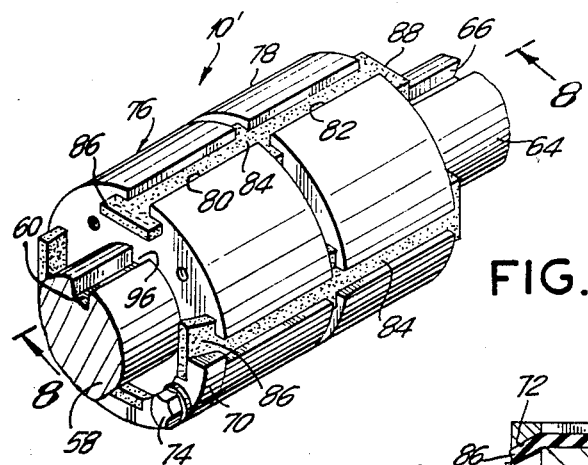
FIG. 7 is a perspective view of an alternate embodiment of the invention, with one of the end plates removed for purposes of clarity.
Figure 8:
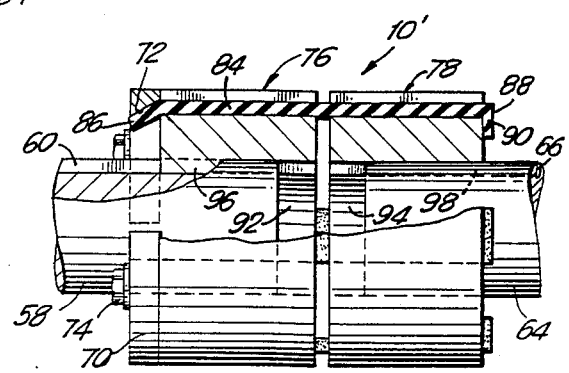
FIG. 8 is a sectional view taken along line 8—8 of FIG. 7, with the end plate added to limit axial movement of the elastomeric member.

In FIGS. 7 and 8, the coupling is designated 10', and the aligned hubs are designated by numerals 76 and 78, respectively. The passageways in hubs 76 and 78 are represented by numerals 80 and 82, respectively. For this embodiment, passageways 80 and 82 have an inverted T-shape, and the elastomeric members 84 have a generally rectangular cross-section configured to be received within the aligned passageways. Here, again, end plates 70 serve to bend the ends 86 of the elastomeric members downwardly to limit axial movement of the members within the aligned passageways. The opposite ends 88 of members 80 may simply have a downwardly extending flange 90 which overlies the end of hub 78.

FIGS. 7 and 8 also show a modification of hubs 76 and 78 wherein each of the respective bores 92 and 94 has a radially inwardly directed projection represented by numerals 96 and 98, respectively, which projections are configured to be received within the keyway slots 60 and 66 of the associated shafts. The integrally formed hub projections 96 and 98 serve to eliminate the need for the separate keys 62 and 68 present in the embodiment of FIGS. 1-4.

Figure 9:
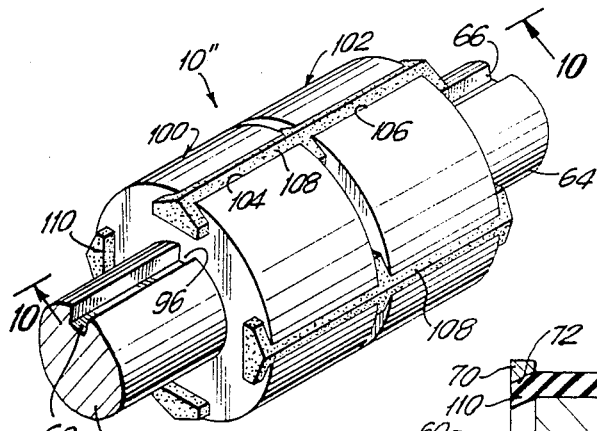
FIG. 9 is a perspective view of yet another embodiment of the invention, with the end plate removed for purposes of clarity.
Figure 10:
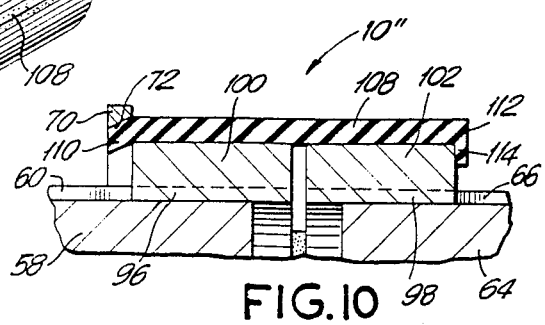
FIG. 10 is a sectional view taken along line 10—10 of FIG. 9, with the end plate added to the coupling.

In FIGS. 9 and 10, the coupling is designated 10", and the aligned hubs are designated by numerals 100 and 102, respectively. The passageways in hubs 100 and 102 are represented by numerals 104 and 106, respectively. For this embodiment, passageways 104 and 106 are wedge-like in shape and the elastomeric members 108 are configured to be received with the aligned passageways. Here, again, an end plate 70 (not shown in FIG. 9 but added to FIG. 10) serves to bend the ends 110 of the elastomeric members 108 downwardly to limit axial movement of the members within the aligned passageways. Also, the opposite ends 112 of members 108 each have a downwardly extending flange 114 which overlies the end of hub 102.

While preferred embodiments of the invention have been shown and described in detail, it will be readily understood and appreciated that numerous omissions, changes and additions may be made without departing from the spirit and scope of the present invention.

I claim:

1. An elastomeric coupling for rotatably connecting the ends of a pair of substantially inline rotatable shafts, said coupling comprising:

a pair of hubs adapted for rotation and located in tandem with one end of each of said hubs located adjacent to one another, the opposite end of each of said hubs having a bore configured to receive an end of one of said respective shafts;

means for connecting the associated hub to the portion of the shaft received therein for rotation therewith;

each of said hubs having a plurality of radially oriented and longitudinally extending passageways communicating with said one end of said hub, wherein selected passageways in one of said hubs are substantially aligned with corresponding passageways in the other one of said hubs to form a plurality of pairs of substantially aligned passageways in said adjacently located hubs;

a plurality of elongated, flexible elastomeric members, each of said elastomeric members having a longitudinal extent greater than the combined length of the pair of adjacently aligned hubs, wherein separate ones of said members are configured to be received within selected pairs of adjacently aligned hub passageways in a close fitting relationship to operatively and drivingly connect said hubs to one another;

each of said elastomeric members being positioned within the associated aligned passageways of said hubs with the opposite ends of said members projecting beyond the opposite ends of said hubs, each of said projecting ends of said members having a hole therein; and a plurality of pins disposed such that a separate pin is removably received within each of the holes of said elastomeric members, each of said pins having a portion projecting beyond an edge of the associated elastomeric member to overlie an end edge of the associated hub passageway, the projecting portions of said pins adapted to abut against an end surface of the adjacent hub upon axial displacement of said elastomeric members to limit axial movement of said members within said aligned passageways during rotation of said hubs;

whereby said elastomeric members transmit the rotation of one of said hubs, imparted by the rotation of its associated shaft, to the other one of said hubs and, thereby, to the shaft associated with said other hub.

2. The elastomeric coupling of claim 1, wherein each of said passageways has a truncated wedge-like transverse cross-section with the narrow portion of said cross-section located at said outer surface of said hub, and each of said elastomeric members has a truncated wedge-like transverse cross-section configured to closely fit within the associated passageway.

3. The elastomeric coupling of claim 1, wherein each of said bores has a keyway slot adapted to be aligned with a corresponding keyway slot in the associated shaft, each of said hubs has a threaded opening communicating between said keyway slot and the outer surface of said hub, and wherein said means for connecting each hub to the associated shaft comprises a key positioned within said aligned keyways and a threaded fastener engaged within said threaded hub opening, said fastener positioned to abut against said key to connect said hub to the associated shaft.

4. The elastomeric coupling of claim 1, wherein said means for connecting each hub member to the associated shaft member comprises a keyway formed in one of said members and a complementary shaped key projection integrally formed as part of said other member, said key projection adapted to be received within said keyway to connect said members together.

5. The elastomeric coupling of claim 4, wherein said key projection is integrally formed as part of said hub and is directed radially inwardly of the associated bore of said hub, said projection adapted to be received within the keyway slot of the associated shaft.

6. The elastomeric coupling of claim 1, wherein the bore in each of said hubs extends longitudinally the full length of said hub along its axis of rotation.

7. The elastomeric coupling of claim 1, wherein said elastomeric members substantially fill the associated spaces defined by the aligned hub passageways in their entirety.

8. The elastomeric coupling of claim 1, wherein each of said elastomeric members has a shape complementary to the shape of the associated passageway.

9. The elastomeric coupling of claim 1, wherein said elastomeric members are the sole elements in said passageways.

10. The elastomeric coupling of claim 1, wherein said plurality of passageways in each of said hubs are disposed in substantially parallel relation to one another so that said elastomeric members are essentially subjected to shear stresses during rotation of said hubs.

11. The elastomeric coupling of claim 1, wherein said passageways are formed in the outer surface of the associated hub to permit visual inspection of said elastomeric members received therein, and said passageways are configured to prevent radially outward displacement of said elastomeric members from said passageways during rotation of said hubs.

12. An elastomeric coupling for rotatably connecting the ends of a pair of substantially inline rotatable shafts, said coupling comprising:

a pair of hubs adapted for rotation and located in tandem with one end of each of said hubs located adjacent to one another, the opposite end of each of said hubs having a bore configured to receive an end of one of said respective shafts;

means for connecting the associated hub to the portion of the shaft received therein for rotation therewith;

each of said hubs having a plurality of radially oriented and longitudinally extending passageways communicating with said one end of said hub, wherein selected passageways in one of said hubs are substantially aligned with corresponding passageways in the other one of said hubs to form a plurality of pairs of substantially aligned passageways in said adjacently located hubs;

a plurality of elongated, flexible elastomeric members, wherein separate ones of said members are configured to be received within selected pairs of adjacently aligned hub passageways in a close fitting relationship to operatively and drivingly connect said hubs to one another;

said elastomeric members being positioned within the associated aligned passageways of said hubs with one end of said members projecting beyond the end of one of said hubs; and at least one end plate removably connected to said end of said hub, said plate having a surface portion adapted to overlie the ends of said passageways in said hub, said overlying surface portion being configured to bend the projecting ends of said elastomeric members beyond the respective end edges of the associated passageways when said plate is connected to said hub to limit axial movement of said members within said aligned passageways during rotation of said hubs;

whereby said elastomeric members transmit the rotation of one of said hubs, imparted by the rotation of its associated shaft, to the other one of said hubs and, thereby, to the shaft associated with said other hub.

13. The elastomeric coupling of claim 12, wherein the opposite end of said elastomeric members project beyond the end of the other one of said adjacently located hubs, the projecting ends of said elastomeric members each having a downwardly extending flange portion disposed to overlie an end edge of the associated passageway.

14. The elastomeric coupling of claim 12, wherein each of said passageways has a truncated wedge-like transverse cross-section with the narrow portion of said cross-section located at said outer surface of said hub, and each of said elastomeric members has a truncated wedge-like transverse cross-section configured to closely fit within the associated passageway.

15. The elastomeric coupling of claim 12, wherein each of said bores has a keyway slot adapted to be aligned with a corresponding keyway slot in the associated shaft, each of said hubs has a threaded opening communicating between said keyway slot and the other surface of said hub, and wherein said means for connecting each hub to the associated shaft comprises a key positioned within said aligned keyways and a threaded fastener engaged within said threaded hub opening, said fastener positioned to abut against said key to connect said hub to the associated shaft.

16. The elastomeric coupling of claim 12, wherein said means for connecting each hub member to the associated shaft member comprises a keyway formed in one of said members and a complementary shaped key projection integrally formed as part of said other member, said key projection adapted to be received within said keyway to connect said members together.

17. The elastomeric coupling of claim 16, wherein said key projection is integrally formed as part of said hub and is directed radially inwardly of the associated bore of said hub, said projection adapted to be received within the keyway slot of the associated shaft.

18. The elastomeric coupling of claim 12, wherein the bore in each of said hubs extends longitudinally the full length of said hub along its axis of rotation.

19. The elastomeric coupling of claim 12, wherein said elastomeric members substantially fill the associated spaces defined by the aligned hub passageways in their entirety.

20. The elastomeric coupling of claim 12, wherein each of said elastomeric members has a shape complementary to the shape of the associated passageway.

21. The elastomeric coupling of claim 12, wherein said elastomeric members are the sole elements in said passageways.

22. The elastomeric coupling of claim 12, wherein said plurality of passageways in each of said hubs are disposed in substantially parallel relation to one another so that said elastomeric members are essentially subjected to shear stresses during rotation of said hubs.

23. The elastomeric coupling of claim 12, wherein said passageways are formed in the outer surface of the associated hub to permit visual inspection of said elastomeric members received therein, and said passageways are configured to prevent radially outward displacement of said elastomeric members from said passageways during rotation of said hubs.

* * * * *